(12) United States Patent
Terry

(10) Patent No.: US 7,950,478 B2
(45) Date of Patent: May 31, 2011

(54) HEAVY CAPACITY TRANSPORTER HAVING MULTIPLE TRACK-AXLES

(75) Inventor: Melvin Dean Terry, Sioux Falls, SD (US)

(73) Assignee: Intelliport Corporation, Bothell, WA (US)

( * ) Notice: Subject to any disclaimer, the term of this patent is extended or adjusted under 35 U.S.C. 154(b) by 196 days.

(21) Appl. No.: 12/292,635

(22) Filed: Nov. 21, 2008

(65) Prior Publication Data

US 2010/0126790 A1 May 27, 2010

(51) Int. Cl.
*B62D 11/20* (2006.01)

(52) U.S. Cl. ..................................... 180/9.46

(58) Field of Classification Search ........... 180/9.44, 180/9.46
See application file for complete search history.

(56) References Cited

U.S. PATENT DOCUMENTS

| | | | |
|---|---|---|---|
| 3,900,077 A * | 8/1975 | Gee et al. .................. | 180/9.46 |
| 3,970,405 A * | 7/1976 | Swisher et al. ............ | 404/105 |
| 4,029,165 A * | 6/1977 | Miller et al. ............... | 180/6.48 |
| 4,360,293 A * | 11/1982 | Wade ........................ | 405/268 |
| 4,789,266 A * | 12/1988 | Clarke et al. ............... | 404/96 |
| 5,199,524 A | 4/1993 | Ivancic | |
| 5,374,879 A | 12/1994 | Pin et al. | |
| 5,379,842 A | 1/1995 | Terry | |
| 5,590,977 A * | 1/1997 | Guntert et al. ............. | 404/101 |
| 5,624,004 A | 4/1997 | Watanabe | |
| 6,336,514 B1 | 1/2002 | Ramacher et al. | |
| 6,481,924 B1 * | 11/2002 | Smolders et al. ........... | 404/105 |
| 6,540,039 B1 | 4/2003 | Yu et al. | |
| 6,692,185 B2 * | 2/2004 | Colvard ..................... | 404/105 |
| 6,722,610 B1 | 4/2004 | Rawdon et al. | |
| 7,137,470 B2 | 11/2006 | Götz | |
| 7,343,991 B2 * | 3/2008 | Rittenhouse .............. | 180/9.5 |
| 2006/0113123 A1 | 6/2006 | Chamaillard et al. | |
| 2006/0113124 A1 | 6/2006 | Durif | |
| 2008/0111327 A1 | 5/2008 | Rhodes et al. | |

OTHER PUBLICATIONS

Muto, Takeshi. "Crawler Transporter" [online], [retrieved on Apr. 26, 2006]. Retrieved from the Internet <URL http://web.archive.org/web/20060105010502/apollomaniacs.web.infoseek.co.jp/apollo/crawlere.htm>.*

Benson, Charles D. et al, "Moonport: A History of Apollo Launch Facilities and Operations" Chapter 13, (National Aeronautics and Space Administration Scientific and Technical Information Office Washington, DC 1978).*

* cited by examiner

*Primary Examiner* — Kevin Hurley

(57) ABSTRACT

A transporter having a plurality of track-axle assemblies. The track axle assemblies have independent suspension, self-loading, and on-center axle rotation capability. Each of the track axle assemblies include a cylinder housing and hydraulic piston and first and second track units connected on opposing sides of the axle frame.

11 Claims, 7 Drawing Sheets

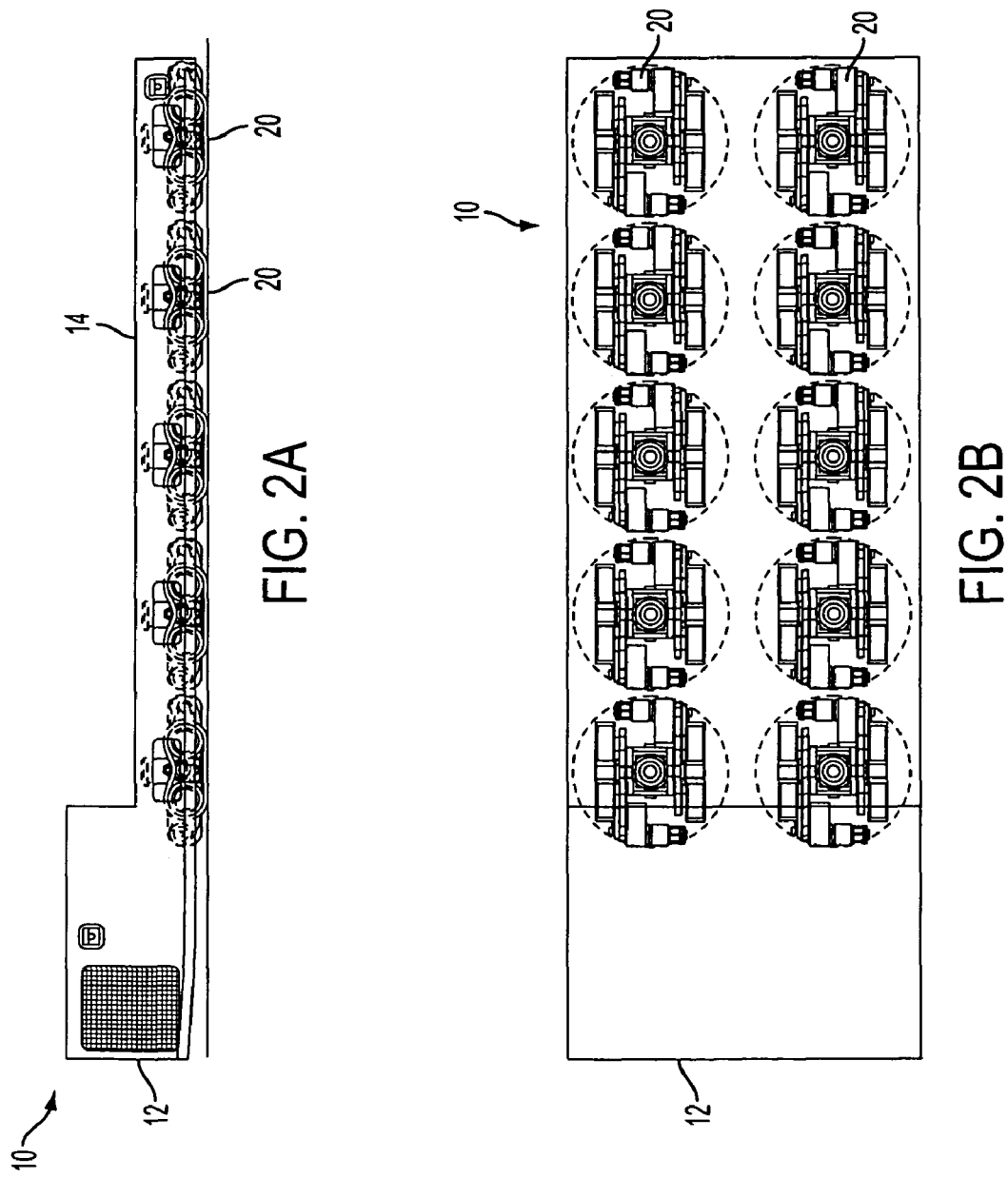

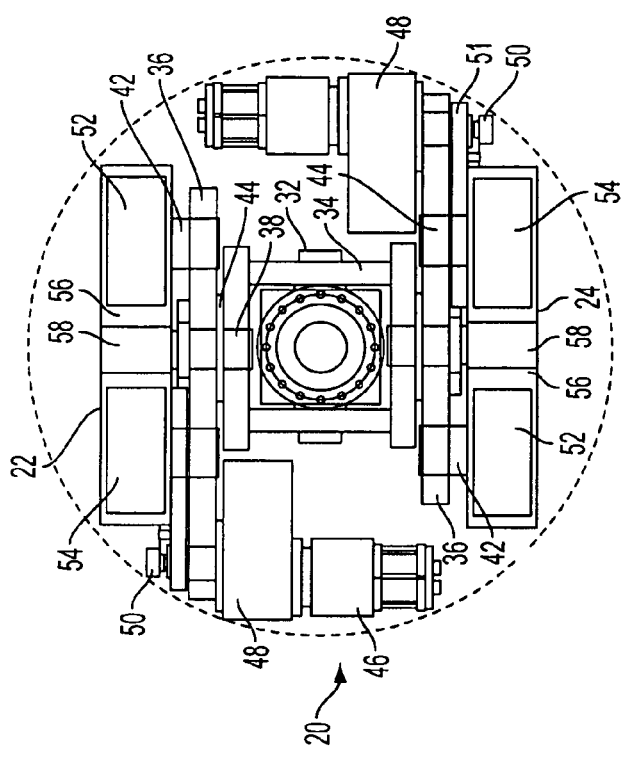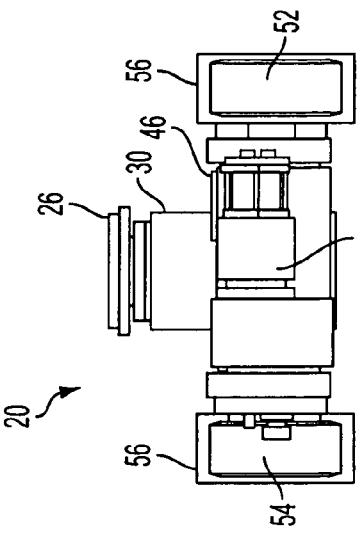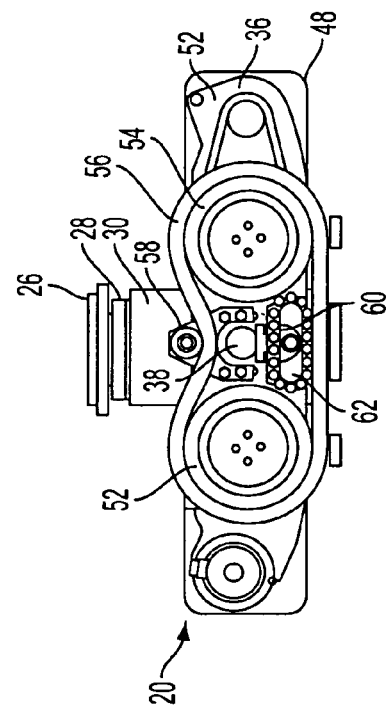

HEAVY CAPACITY TRANSPORTER HAVING MULTIPLE TRACK-AXLES

BACKGROUND OF THE INVENTION

1. Field of the Invention

The present invention relates to a transporter having track-axles in order to carry very heavy loads. More particularly, the present invention relates to a transporter having multiple track-axles that have independent suspension, self-loading, and on-center axle rotation capability in order to carry very heavy loads without damaging the transport surface.

2. Description of the Related Art

Industrial facilities, including factories, power plants and shipyards, often require that very large, heavy and often delicate objects be moved both within buildings of the industrial facility and between buildings.

One method in which very heavy objects can be moved within an industrial facility is through the use of cranes. One example of a crane used in an industrial facility is a gantry crane which includes a hoist in a trolley running horizontally along gantry rails. The gantry crane has the disadvantages of a large size, especially height, and a lack of maneuverability. Another example of a crane used in an industrial facility is an overhead crane system including beams mounted on the side walls of a building. In the overhead crane system, the hoist is on a trolley which moves along the beams. A disadvantage of the overhead crane is that objects cannot be transported from one bay to another or outside of the building beyond which the overhead crane's track system extends.

Another method of moving objects within an industrial facility is through the use very heavy capacity fork lifts and heavy capacity trailers, both of which require extended operating space and place heavy point-loading on the operating surfaces.

Heavy capacity fork lifts typically have solid tires, or limited mechanically equalizing suspension relying on compression of the tires for compliance to uneven operating surfaces. Very heavy capacity solid tire trailers are limited to mechanical equalizing suspension, therefore providing limited compliance and maneuverability on irregular floors and congested spaces. The latter have sharply diminishing capabilities for loads rise above 40 tons.

For the transport of very heavy loads within an industrial facility, where loads are generally in excess of 80 tons, In Plant-Self-Propelled Modular Transporters (IP-SPMT) may be utilized. An IP-SPMT refers to a low-profile deck, multi-axle, self-propelled transporter, with independent suspension axle assemblies that are typically used to carry loads heavier than 80 tons and ranging into hundreds of tons. An IP-SPMT is typically internal combustion engine-electric powered and has six to twelve or more on-center rotation axle assemblies. The axles can be independently steered by varying each wheel motor speed and direction.

However, in certain applications, existing movers and IP-SPMT devices are not sufficient because their wheels can overload the operating surfaces. One proposed solution is to use air bearings or the like which require special surface preparations. Another proposed solution is to use tracked type vehicles which lack the maneuverability and have much larger space requirements.

The inventor of the present invention has previously proposed an IP-SPMT in U.S. Pat. No. 5,379,842 capable of carrying very heavy loads of over 80 tons to address some of the shortcomings of the prior art. In the material-handling equipment of U.S. Pat. No. 5,379,842, a multi-wheeled transport vehicle capable of carrying very heavy loads while crossing uneven terrain without torquing the load was disclosed. The material handling equipment included a modular wheel unit 5 shown in FIG. 1. The modular wheel unit 5 permitted a low profile and included means 7 to equalize the load between the individual wheel units.

However, the material-handling equipment of U.S. Pat. No. 5,379,842 utilized solid urethane tires 9 with tire surface contact pressures ranging typically from 600 to 900 psi. The use of those existing design axle assemblies result in contact pressures that can create rutting in asphalt road surfaces, possibly requiring the users to resurface the roadway after use or to replace their roadbed with concrete surfaces designed to take the specific wheel loading. For example, when a spent nuclear fuel container weighing over 80 tons is required to be moved from a fuel building of a power plant to an Independent Spent Fuel Storage Installation (ISFSI), the heavily shielded nuclear fuel container must typically be moved 1,000 to 5,000 feet or more from the fuel building. Roadbeds leading to the ISFSI spent fuel storage locations are typically asphalt and often require the roads to cross buried utility trenches, which are both situations raising concern for tire contact pressure.

Accordingly, it is desired to have a transporter which can carry very heavy loads while reducing the contact pressure on the roadway, while at the same time providing a high degree of maneuverability.

SUMMARY OF THE INVENTION

The present invention provides a track-axle assembly for use in a transporter, including an axle frame including a cylinder housing and hydraulic piston and first and second track units connected on opposing sides of the axle frame.

Each track unit of the track-axle assembly may include a side plate pivotably mounted to the axle frame; an idler axle and a driver axle mounted on the side plate; an electric motor and a gear box mounted on the side plate; power transmission means extending between the gear box and the driver axle to rotate the driver axle; and an idler wheel and a driver wheel mounted on the idler axle and driver axle, respectively. For those familiar with the art it is to be understood that hydraulic motors could also be used.

Each track unit of the track-axle assembly may further include a track belt fit over both the idler wheel and driver wheel; a tensioner roller or means to tighten the track belt; a track support frame mounted between the idler wheel and the driver wheel; and a track roller support assembly or low friction pad articulately mounted on track support frame. The track roller assembly may include a sensor that measures side loading on the track belt.

Another aspect of the present invention is to provide a transporter including a frame and load deck; a power compartment; a machine logic controls and electrical compartment; a hydraulic or fluid power unit; and a plurality of track-axle assemblies positioned below the load deck.

The power compartment of the transporter may include a combustion engine, generator and battery.

The track-axle assemblies of the transporter may include an axle frame including a cylinder housing and hydraulic piston; and first and second track units connected on opposing sides of the axle frame, each of the track units including a driver wheel and an idler wheel contained within a track belt, the driver wheel being rotated by a motor.

The processor of the transporter may include a machine logic controller to control each of the track-axle assemblies, and the machine logic controller includes steering logic to linearly, laterally, obliquely, and rotationally control the track-axle assemblies; a steering calculator to perform steering algorithm calculations for the plurality of track-axle assemblies; a speed/direction controller to provide command signals to the individual track-axle assemblies; and a suspension controller to lift and carry the load, raise and lower the transporter, establish and maintain a mean travel height, and to provide sequential load relief.

The load relief controller of the transporter may decrease a fluid pressure to the cylinder housing of selected single or pairs of track-axle assemblies to transfer a portion of their load onto surrounding fully pressurized cylinder housings.

The cylinder housing of the transporter may be pivotally mounted on the axle frame by a pair of trunnion pins that allow the track units to tilt in reaction to laterally uneven surfaces.

The suspension controller of the transporter may control a fluid pressure acting on each of the hydraulic pistons of each of the track-axle assemblies to provide interaction between multiple track-axle assemblies to negotiate surface irregularities along a line of travel of the transporter.

The lift circuit of the transporter may be fitted with pressure transducers.

The electrical compartment of the transporter may include a shore power connection.

The track-axle assemblies of the transporter may include a fluid pressure transducer, angularity and lift sensors, wheel speed/direction sensors and track stress sensors.

The transporter may also include a wireless, tethered or embedded operator interface.

An aspect of the present invention is a method of synchronously steering the track axle assemblies to perform limited radius turning capability.

Another aspect of the present invention is when travel steering reaches a stress limit of side loading on the track assemblies, a method is provided which includes stopping the transporter when a closer turning radius is required; sequentially unloading, rotating to the new travel direction, and reloading each of the track-axle assemblies; and starting the transporter in the new travel direction.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 2A-2C are side, top and end views of a transporter according to an embodiment of the present invention, respectively;

FIGS. 3A-3C are top, side and front views of a track-axle assembly according to an embodiment of the present invention, respectively;

DETAILED DESCRIPTION OF THE PREFERRED EMBODIMENTS

Figure 1:
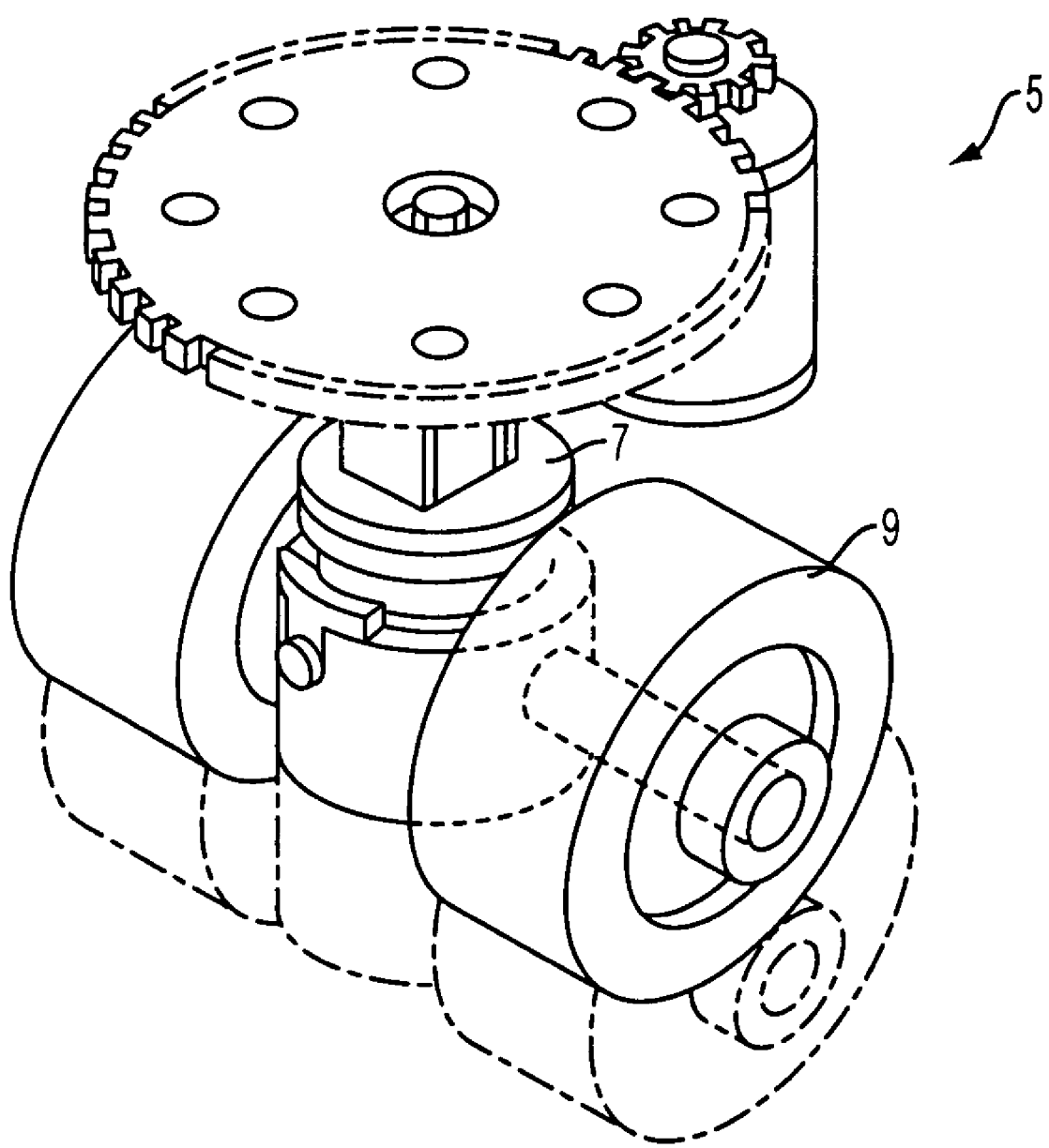
FIG. 1 is a perspective view of a modular wheel unit of a conventional transporter.

Reference will now be made in detail to the embodiments of the present invention, examples of which are illustrated in the accompanying drawings, wherein like reference numerals refer to the like elements throughout. The embodiments are described below to explain the present invention by referring to the figures.

FIGS. 2A-2C show a transporter 10 which includes a power compartment 12, a load deck 14 and a plurality of track-axle assemblies 20.

Figure 4:
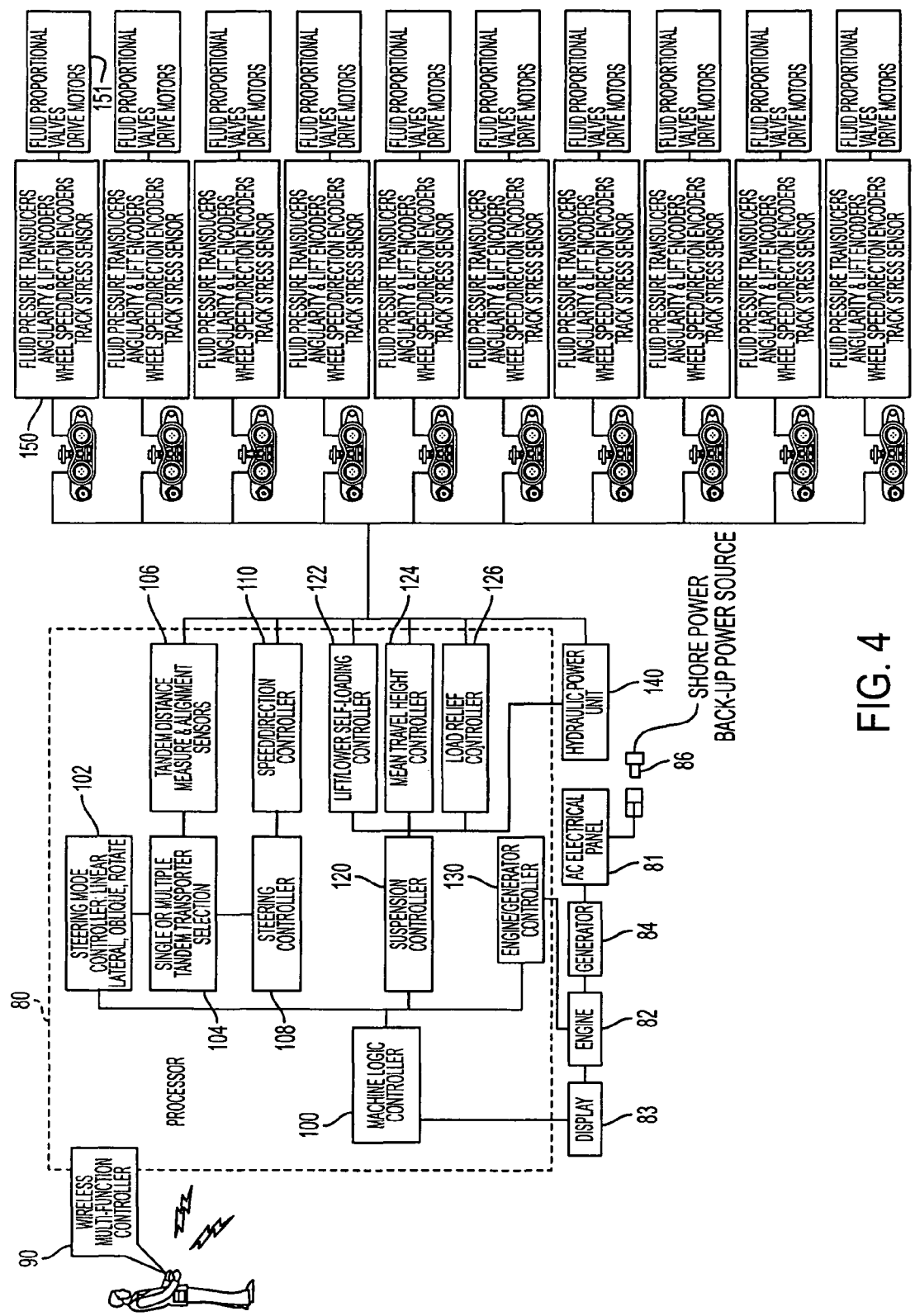
FIG. 4 is a control schematic of the transporter according to an embodiment of the present invention.

The power compartment 12 contains a combustion engine driven power plant, battery and shore power connection, which are shown in FIG. 4. Illustrated compartments also include a machine logic controller 80, an AC electrical panel 81, a display 83 and a hydraulic power unit 140. The combustion engine driven power plant includes an engine 82 and a generator 84. As an alternative to a combustion engine driven power plant, shore power 86 may be connected to the electrical panels to power the transporter 10.

The transporter 10 shown in FIGS. 2A-2C shows ten track-axle assemblies 20, although it is contemplated for the transporter to include more or less track-axle assemblies 20. Each of the track-axle assemblies 20 has independent suspension, is self-loading, and has on-center axle rotation.

As shown in FIGS. 3A-3C, each of the track-axle assemblies includes a first track unit 22 and a second track unit 24. Each of the track units 22 and 24 are independently functioning and independently powered on each track-axle assembly. The onboard computer provides precision differential steering control of each track unit.

The track-axle assembly 20 is a multi-directional articulating frame structure where the imposed load is equally transmitted and distributed to the road surface in the broadest possible individual points of contact. Referring specifically to FIG. 3B, the unnumbered boxes below the track belt 56 represent surface contact areas. As shown, the track axle assembly allows for ground loading to be equally distributed over a much larger surface contact area than a conventional individual wheel unit. Referring again to FIGS. 3A-3C, the track-axle assembly connects to the underside of the transporter 10 by a mounting plate 26. Attached to mounting plate 26 is the top of a center column hydraulic piston 28. The hydraulic piston 28 is contained in a cylinder housing 30 which is trunnion-pin 32 mounted into the open-center axle frame 34 in such a manner as to allow the axle frame to tilt in either direction to accommodate lateral variances in the travel surface. The track units 22 and 24 are formed on opposing sides of the axle frame 34. Each of the track units 22 and 24 includes a side plate 36 pivotably mounted on the axle frame 34 by using trunnion pins 38 with heavy low-friction thrust washers 40. The trunnion pins 38 have a bolted face plate and thrust washer 40 to securely hold the side plates 36 in contact with the open-center axle frame 34. To the side plate 36 is mounted an idler axle 42 and a driver axle 44. Also mounted to the side plate are an electric motor 46 and a gear box 48. The drive shaft extends through the side plate 36, and is fitted with a sprocket (not shown) and an encoder 50 that transmits data to the onboard processor 80. Reference numeral 51 designates the power transmission means from the gear box 46 to the driver axle 44 and may include a roller chain, timing belt, gear train, or other suitable power transmission means.

An idler wheel 52 and a driver wheel 54 are mounted on the idler axle 42 and driver axle 44, respectively. A track belt 56 is fit over both of the idler wheel 52 and driver wheel 54. A tensioner roller 58 tightens the track belt 56. Solidly mounted between the idler wheel 52 and the driver wheel 54 is a track support frame 60, to which a track roller support assembly 62 is articulately mounted. The track roller assembly 62 could include a sensor that measures side loading on the track belt 56 and communicates with the onboard processor 80 to control the maximum allowable stress on the track assembly and operating surface while traveling under loaded conditions.

Referring to FIGS. 4 and 5A-5F, a user directs the path of the transporter 10 through a wireless user interface 90 to direct the path of the transporter anywhere on the transporter's 10 X or Y centerlines. Specifically, the onboard processor 80 collects and combines information from all of the track-axle assemblies 20 located under the transporter 10, to individually synchronize each track-axle assemblies directional control in a manner that will, for straight line travel (See FIG. 5A), align and hold all track-axle assemblies 20 in parallel, either in line with the center line of the transporter 10 for normal linear forward travel, or, perpendicular to the transporters centerline for straight lateral travel (See FIG. 5B), and similarly for straight line diagonal travel. In unloaded or lightly loaded conditions, the transporter can rotate on-center, or about any predetermined point on the X or Y centerline. Typically the transport accomplishes random radius turning, where all track-axle assemblies 20 will point to a single "floating" center point (See FIG. 5C) that is free to move.

In the transporter 10, the X and/or Y centerlines can be anywhere in relation to the center of mass of the transporter 10 or load being carried. Although the default center point of rotation is normally the geometric center point of the axle locations in plan view, it is contemplated that to meet certain conditions, such as a long overhanging load, where it is desirable to rotate about the centerline of the load rather than the centerline of the transporter, the center point of rotation can be anywhere in space on a horizontal plane.

The transporter 10 functions with certain similarities to current solid tired axle supported transporters, but the transporter 10 operates with dramatically reduced surface contact pressures.

Figure 5:
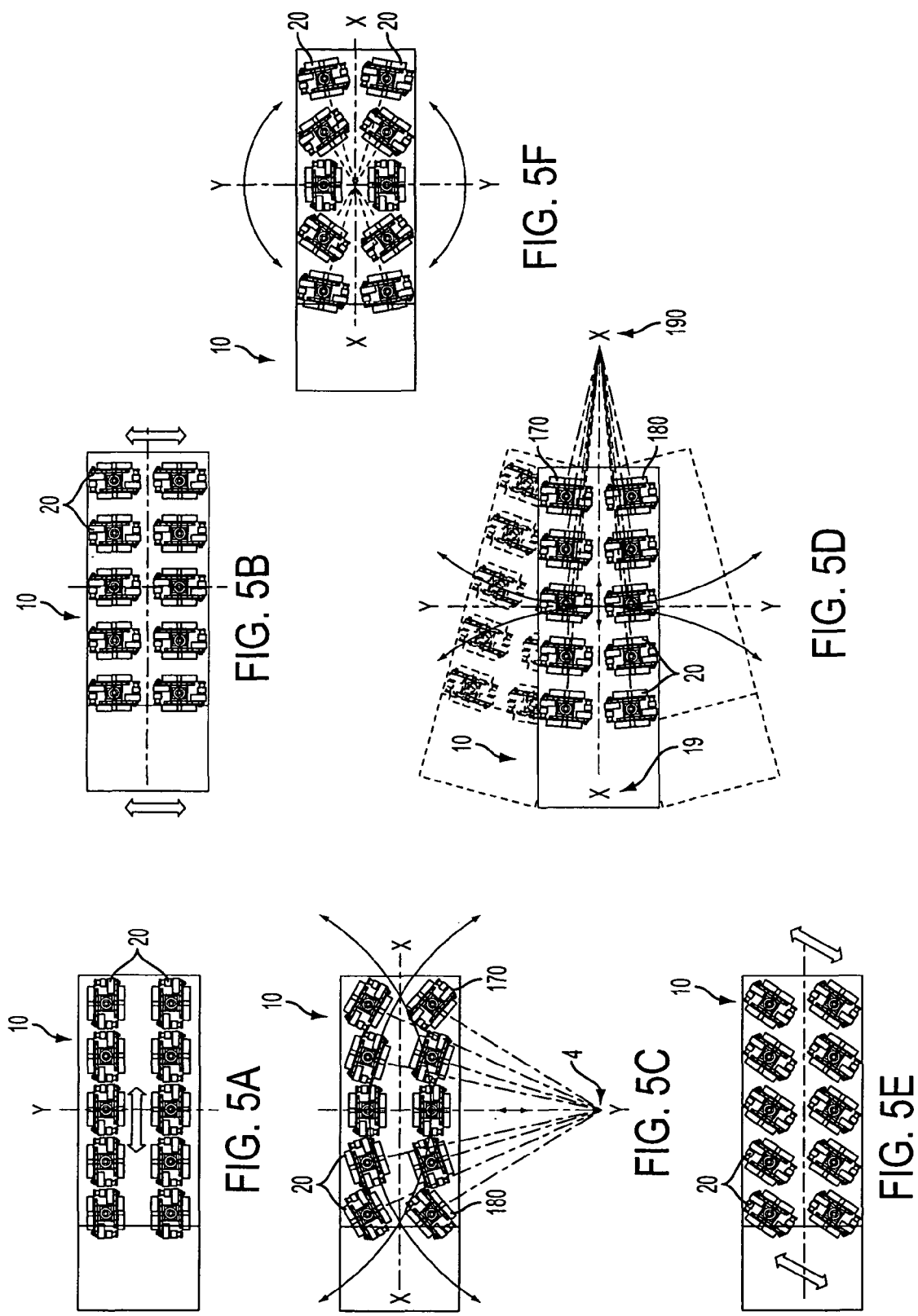
FIGS. 5A-5F are top views of the transporter performing linear, lateral, radial turning, oblique and on-center rotational travel according to an embodiment of the present invention, respectively.

Referring to FIG. 5F, the on-center rotation of the track axle assembly 20 requires some degree of skidding of the tread on the operating surface and the amount of allowable skidding could be control by sensors that monitor side load stress on the individual track assemblies.

The transporter 10 has the capability of performing radical or much sharper turn steering functions involving significant changes in direction, such as longitudinal to lateral travel, longitudinal to on-center rotation, or any random radius turning that places out-of-tolerance stress on the track and/or operating surface. For example, a radical steering function would be a situation where when the transporter 10 is standing, the track-axle assemblies 20 would be rotated up to 90 degrees or greater to change the transporter's direction from longitudinal travel to lateral travel.

Control operations of the transporter take place in the processor 80 of the transporter 10. Referring to FIG. 4, the processor 80 includes a machine logic controller 100 to control each of the track-axle assemblies 20. The machine logic controller 100 includes a steering mode controller 102 for linear, lateral, oblique, and rotational control of the track-axle assemblies 20. A single or multiple transporter selection controller 104 is provided when more than one transporter 10 is used in synchronicity. A tandem distance measurement controller 106 is provided for multiple transporter operation. A steering calculator 108 is provided to perform multi-axle steering algorithm calculations. A speed/direction controller 110 provides command signals to the individual track-axle assemblies 20. A suspension controller 120 includes a lift/lower controller 122 to lift and lower the transporter 10, a mean travel height controller 124 and a load relief controller 126 to provide sequential load relief and to support radical axle rotation function. An engine/generator controller controls the engine 82 and generator 84.

The load relief controller 126 may momentarily decrease the fluid pressure to selected single or pairs of track-axle assemblies 20, thereby transferring the majority of their load onto the surrounding fully pressurized axles. When radical steering functions are necessary, the transporter 10 stops and in a controlled sequence, the unloaded track-axle assemblies, through differential steering, power rotate on-center using only the weight of the lower segment of the track-axle without the additional energy needed to overcome the resistance that would otherwise be required to partially skid each individual track-axle assembly 20 as they rotate to the new direction of travel. The process of programmed turning sequentially moves around each of the track-axle assemblies 20 of the transporter 10, rotating one or two track-axle assemblies 20 at a time until all of the track-axle assemblies 20 are ready to travel segmentally, perpendicularly, or travel obliquely to the last general travel line.

The ability of each track-axle assembly 20 to be independently pivoted in the vertical plane about the track-axle assemblies 20 center point connection to the axle frame 34 provides that when surface undulations and irregularities are encountered, it will be assured that the track-axle assemblies 20 obtain optimum surface contact at all times.

Referring to FIG. 4, the suspension controller 120 provides interaction between multiple track-axle assemblies 20 while negotiating undulating surface irregularities along the line of travel of the transporter 20. The suspension controller controls the fluid pressure acting on each of the hydraulic pistons 28 of each of the track-axle assemblies 20. As previously discussed, the cylinder housing 30 is pivotally mounted in the axle frame 34 on a pair of trunnion pins 38 that allow the track units 22 and 24 to articulate or tilt in reaction to laterally uneven surfaces. The hydraulic piston 28 and cylinder housing 30 also provide fluid suspension lift for self-loading.

The transporter's 10 deck 14 can be lowered to drive under column, stand, or rail supported loads, and the transporter can then be driven into the resulting portal or tunnel space. Once in position, the hydraulic pistons 28 of each of the track-axle assemblies 20 will raise the deck 14 of the transporter 10 to engage and then lift the load clear of contact with the floor surface. During travel with the load, the hydraulic pistons 28 are positioned at roughly their mid-stroke point, which allows them to provide the equalizing suspension function by then individually raising or lowering the hydraulic pistons 28 to comply with changing or undulating surface conditions along the line of travel.

Each track-axle assembly is equipped with an array of sensors 150 including fluid pressure transducers, angularity and lift sensors, wheel speed/direction sensors and track stress sensors which are monitored by the processor. The processor 80 monitors the loading of each cylinder housing 30 and adds or removes fluid to maintain the loading within the prescribed tolerance for the load being carried, thereby assuring equalized loading across every lift point. It is to be noted that equalizing suspension can also be accomplished by dividing the number of cylinders 30 into three hydraulic line interconnected groups that will allow free interchange of oil between all of the cylinders within a grouping of fluid proportional valves and drive motors 151. Based on three-point suspension geometry, and with the articulating track-axle assemblies 20, this configuration also assures equalized loading on every axle's surface contact points.

Further, the information obtained from each cylinder's 30 pressure transducer allows the processor 80 to calculate and show on the display 83 the weight and center-of-gravity of the load being carried on a real time basis. In a typical transporter configuration, the lift height of each cylinder 30, or group of cylinders 30, will be monitored by linear position sensors that report to the processor 80 the individual lift height of the hydraulic pistons 28 for comparison with other cylinders 30 or groups of cylinders 30. This information, along with output from a two-axis inclinometer, can be further used to provide automatic load leveling when the transporter is negotiating ramps or similar surface conditions.

By coupling the aforementioned capabilities with first and second track units 22 and 24 on to each track-axle assembly 20, the ground loading can be further equally distributed over a much larger set of surface contact areas, which dramatically reduces the surface contact pressures to the point of making travel on asphalt surfaces without rutting feasible and practical.

Further, the use of track-axle assemblies 20 as the load bearing contact surface in equally distributing the load from the center point to each vertically pivoting tracked wheel 52 and 54 provides the opportunity to significantly increase the load bearing area and dramatically reduce surface contact pressure. While the track belt 56 provides travel motion, the load transfer to the operating surface is directly below the driver wheels 54 and idler wheels 52 and the center mounted, vertically articulating, track roller support assembly 62. The track roller support assembly 62 thereby equally shares the load and optimizes surface contact. Alternatively to a track belt, a low friction slide assembly is contemplated for use with the present invention.

As shown in FIGS. 5A-5F, a single operating transporter 10 (depicted here with ten independent track-axle assemblies) essentially has near omni-directional travel capability, including longitudinal travel as shown in FIG. 5A, lateral travel as shown in FIG. 5B and oblique travel as shown in FIG. 5E.

Referring to FIG. 5C, the practical radius of turn from a "floating" center point on the Y axis will be with the two furthest opposing track-axle assemblies on the inside radius 170, 180, gradually rotating to the point of maximum allowable side loading stress on the track assemblies during sustained travel of the transporter. The travel speed and allowable surface scrubbing stress will dictate the timing required for significant changes in direction from left to right when traveling. If the surface scrubbing stress approaches the allowable limit, the transporter will stop when a stress limit is reached or when a sharper turn is required, and the track-axle assemblies will sequentially be depressurized and rotated to the desired turning angle. When the desired radial travel distance is completed, track scrubbing stress will determine whether the transporter can return to straight line travel while continuing forward or if a stop and sequential axle repositioning is required.

Referring to FIGS. 5A, 5B and 5D, when changing from longitudinal travel to lateral travel, as the operator selects Lateral Travel on the wireless controller 90, the transporter 10 will automatically stop and the track-axle assemblies 20 will sequentially rotate to the Lateral Travel orientation as shown in FIGS. 5B and 5D. The center point of rotation will now be along the X axis 190 and the angularity of the radially inward track-axle assemblies 192 and 194 will be governed by the same conditions outlined for longitudinal travel above.

Figure 6:
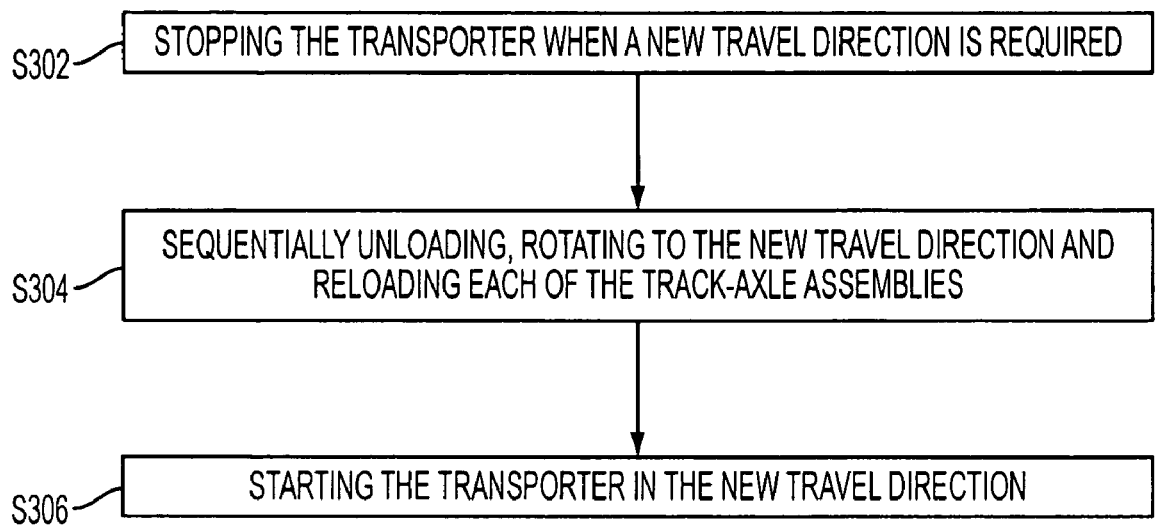
FIG. 6 is a flow chart showing a method of driving a transporter according to an embodiment of the present invention.

Referring to FIG. 5F, on-center rotation of the transporter 10 or whatever X-Y centers are programmed into the processor 80, are likewise accomplished by sequential turning procedures, though this maneuver will only be practical when the transporter is in a no-load condition FIGS. 5A-5F showed various travel modes including longitudinal, lateral, oblique and turning modes. These travel modes are accomplished using the method of driving a transporter having a plurality of track-axle assemblies as shown in FIG. 6. Initially, the transporter 10 is traveling in a straight direction. At operation S302, the transporter 10 is stopped when a user desires a new travel direction for the transporter. Next, each of the track-axle assemblies 20 is sequentially unloaded, rotated to the new travel direction and reloaded at operation S304. The transporter then begins traveling in the new direction at operation S306.

Figure 7:
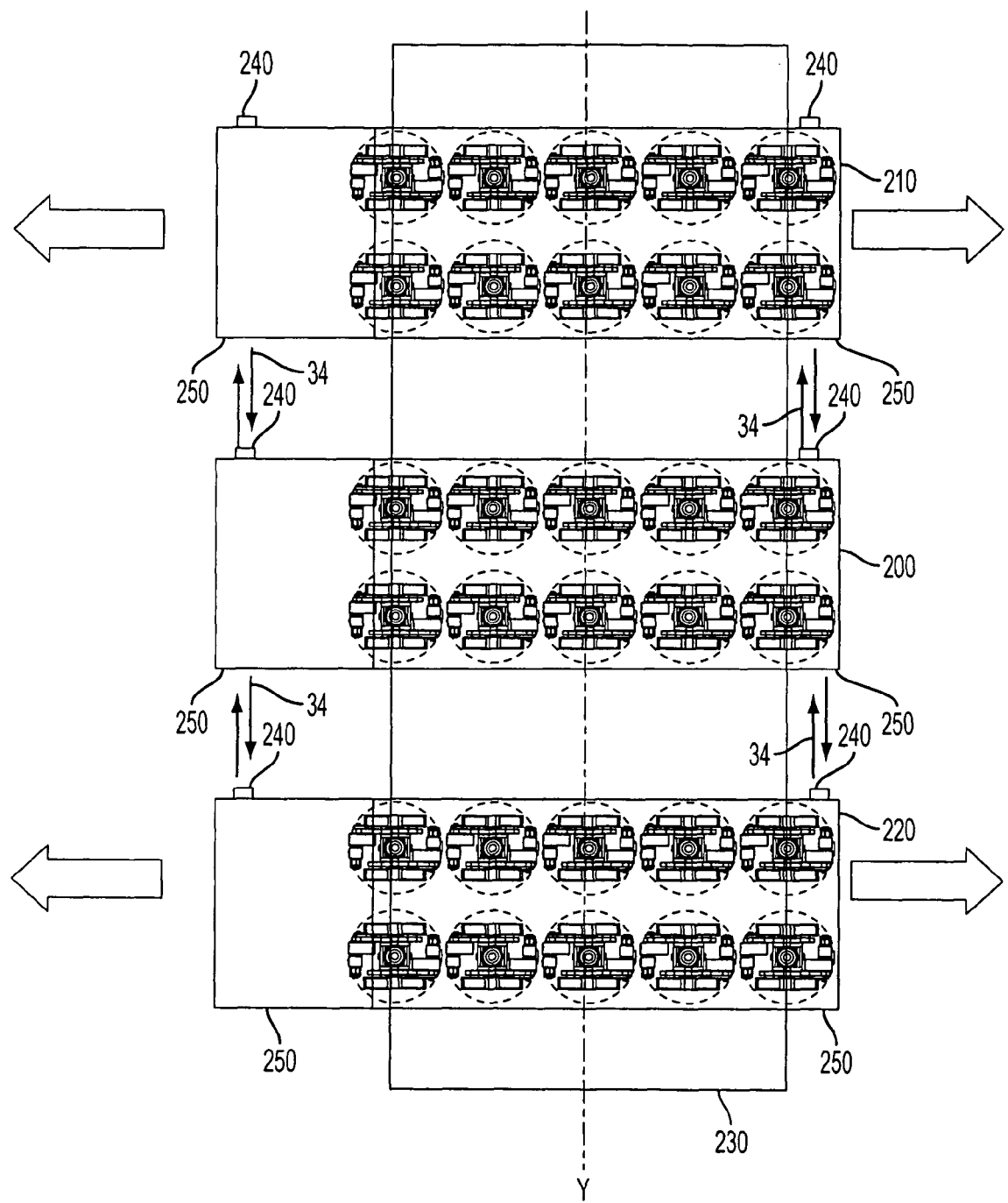
FIG. 7 is a top view of multiple transporters operating in synchronicity according to an embodiment of the present invention.

Referring to FIG. 7, multiple transporters may also be operated in synchronicity while supporting a common load or loosely referred to as "tandem" operation. Tandem operations are normally employed where long loads or loads with overhanging centers-of-gravity are being carried. In support of heavy product assembly operations, operators will independently drive the transporters under stand-supported loads and position them to be parallel and/or perpendicular to adjacent units. With the transporters positioned in line and parallel on the X & Y axes, one transporter is chosen to become a master transporter 200 to which other slave transporters 210 and 220 will be subordinate or "slaved." Now under control of a single operator, the hydraulic pistons of all transporters will be activated and the decks of all of the transporters will raise to lightly contact the underside of the load 230 to be moved.

In tandem operations, the transporters 200, 210, 220 can be equipped with distance sensor 240 and matching reflective targets 250. On the operator's command, the processors of the transporters 200, 210 and 220 can activate the distance sensor transmitters 240 to precisely measure the separation distance between the adjacent transporters. The separation distance will feed into the processor and the geometric positioning of all track-axle assemblies are registered and computed for full synchronous operation. Two, three, four, or more transporters can now function as a single entity with all track-axle assemblies parallel or fixed on the single floating center point of rotation.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A transporter, comprising:
    an engine compartment, the engine compartment including a diesel-electric power plant, a processor, an AC electrical panel, a display, and a hydraulic power unit;
    a load deck; and
    a plurality of track-axle assemblies positioned below the load deck, the track-axle assemblies including an axle frame including a cylinder housing and hydraulic piston, and first and second track units connected on opposing sides of the axle frame, each of the track units including a driver wheel and an idler wheel contained within a track belt, the driver wheel being rotated by an electric motor, wherein the processor includes a machine logic controller to control each of the track-axle assemblies, the machine logic controller comprising
   a steering mode controller to linearly, laterally, obliquely, and rotationally control the track-axle assemblies;
   a steering calculator to perform steering algorithm calculations for the plurality of track-axle assemblies;
   a speed/direction controller to provide command signals to the individual track-axle assemblies; and
   a suspension controller including a lift/lower controller to lift and lower the transporter, a mean travel height controller, and a load relief controller to provide sequential load relief.

2. The transporter according to claim 1, wherein the load relief controller decreases a fluid pressure to the cylinder housing of selected single or pairs of track-axle assemblies to transfer a portion of their load onto surrounding fully pressurized cylinder housings.

3. The transporter according to claim 1, wherein the cylinder housing is pivotally mounted on the axle frame by a pair of trunnion pins that allow the track units to tilt in reaction to laterally uneven surfaces.

4. The transporter according to claim 1, wherein the suspension controller controls a fluid pressure acting on each of the hydraulic pistons of each of the track-axle assemblies to provide interaction between multiple track-axle assemblies to negotiate undulating surface irregularities along a line of travel of the transporter.

5. The transporter according to claim 1, wherein the cylinder housing is fitted with a pressure transducer.

6. The transporter according to claim 1, wherein the AC electrical panel includes a shore power connection.

7. The transporter according to claim 1, wherein each of the track-axle assemblies include a fluid pressure transducer, angularity and lift encoders, wheel speed/direction encoders and track stress encoders.

8. The transporter according to claim 1, further comprising a wireless operator interface.

9. A method of operating a plurality of the transporters according to claim 1 in synchronicity, the method comprising:
   providing a plurality of the transporters according to claim 1;
   designating one of the plurality of transporters a master transporter; and
   designating a remainder of the plurality of transporters as slave transporters,
   wherein the machine logic controller of the master transporter controls the slave transporters to operate in synchronicity while supporting a common load.

10. The method according to claim 9, wherein the master and slave transporters each include a sensor to measure the distance to an adjacent transporter when positioning under a common load for synchronous travel to maintain coordinated steering between the master and slave transporters.

11. The method according to claim 10, wherein the machine logic controller of the master transporter computes the geometry for the plurality of transporters when operating in a synchronous mode.

* * * * *